US009532290B2

(12) United States Patent
Li et al.

(10) Patent No.: US 9,532,290 B2
(45) Date of Patent: *Dec. 27, 2016

(54) HANDOVER WITH MOBILE RELAYS

(71) Applicant: FUJITSU LIMITED, Kawasaki-shi, Kanagawa (JP)

(72) Inventors: Zhaojun Li, Guildford (GB); Sunil Keshavji Vadgama, Ashford Middlesex (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,479

(22) Filed: Apr. 14, 2016

(65) Prior Publication Data
US 2016/0227461 A1    Aug. 4, 2016

Related U.S. Application Data

(63) Continuation of application No. 14/638,611, filed on Mar. 4, 2015, now Pat. No. 9,344,948, which is a
(Continued)

(30) Foreign Application Priority Data

Sep. 10, 2012 (EP) .................................... 12183655

(51) Int. Cl.
*H04W 36/30* (2009.01)
*H04W 36/00* (2009.01)
(Continued)

(52) U.S. Cl.
CPC ......... *H04W 36/30* (2013.01); *H04W 36/0016* (2013.01); *H04W 36/0055* (2013.01);
(Continued)

(58) Field of Classification Search
CPC ............. H04W 36/30; H04W 36/0016; H04W 36/0055; H04W 36/0094; H04W 36/22; H04W 36/08
See application file for complete search history.

(56) References Cited

U.S. PATENT DOCUMENTS 8,045,525 B1    10/2011    Bontu et al.
8,059,603 B2    11/2011    Jin
(Continued)

FOREIGN PATENT DOCUMENTS

EP    2 051 458 A2    4/2009
EP    2 603 038 A1    6/2013
(Continued)

OTHER PUBLICATIONS

Extended European search report with supplementary European search report and the European search opinion issued for corresponding European Patent Application No. 12183655.5, mailed Feb. 14, 2013.
(Continued)

*Primary Examiner* — Leon Flores
(74) *Attorney, Agent, or Firm* — Myers Wolin, LLC

(57) ABSTRACT

A method to provide mobility support of UEs (12) that are served by mobile relay base stations (14), by providing handover of a UE(12) for data traffic only between two mobile relay base stations. This is achieved by information exchanging between the source and target mobile relay stations of the concerned UE in handover, and/or the corresponding donor base stations (13, 11) if applicable. The handover is triggered by any of the following: based on UE's measurement report, the signal quality of a neighbor cell is better than the current serving cell; based on the measurement of the serving mobile relay base station, the signal quality of the link to the UE is worse than a certain threshold; or based on the measurement of the serving mobile relay base station, the signal quality of a neighbor
(Continued)

cell (potential donor base station) is much better than the current donor base station.

20 Claims, 6 Drawing Sheets

Related U.S. Application Data continuation of application No. PCT/EP2013/066006, filed on Jul. 30, 2013.

(51) Int. Cl.
  *H04W 36/22* (2009.01)
  *H04W 36/08* (2009.01)
  *H04W 84/04* (2009.01)

(52) U.S. Cl.
  CPC ....... *H04W 36/0094* (2013.01); *H04W 36/22* (2013.01); *H04W 36/08* (2013.01); *H04W 84/047* (2013.01)

(56) References Cited

U.S. PATENT DOCUMENTS

| | | | |
|---|---|---|---|
| 9,344,948 B2* | 5/2016 | Li | ................... H04W 36/0094 |
| 2007/0104148 A1 | 5/2007 | Kang et al. | |
| 2007/0249347 A1 | 10/2007 | Saifullah et al. | |
| 2008/0108350 A1 | 5/2008 | Hamasaki et al. | |
| 2008/0165736 A1 | 7/2008 | Zhao et al. | |
| 2008/0316968 A1 | 12/2008 | Sun et al. | |
| 2009/0088164 A1 | 4/2009 | Shen et al. | |
| 2009/0097449 A1 | 4/2009 | Jin | |
| 2009/0131084 A1 | 5/2009 | Comstock et al. | |
| 2009/0207804 A1 | 8/2009 | Chou et al. | |
| 2009/0285182 A1 | 11/2009 | Zou et al. | |
| 2009/0318166 A1 | 12/2009 | Kim et al. | |
| 2010/0061339 A1 | 3/2010 | Kim et al. | |
| 2010/0248619 A1 | 9/2010 | Senarath et al. | |
| 2011/0086639 A1 | 4/2011 | Kalervo Hamalainen et al. | |
| 2011/0124330 A1 | 5/2011 | Kojima | |
| 2011/0134887 A1 | 6/2011 | Jeon et al. | |
| 2011/0194407 A1 | 8/2011 | Ji et al. | |
| 2012/0003962 A1 | 1/2012 | Jeon et al. | |
| 2012/0140700 A1 | 6/2012 | Huang | |

FOREIGN PATENT DOCUMENTS

| | | |
|---|---|---|
| JP | 2011-135439 A | 7/2011 |
| WO | 2011/020432 A1 | 2/2011 |
| WO | 2011/137775 A1 | 11/2011 |

OTHER PUBLICATIONS

International Search Report with Written Opinion of the International Searching Authority issued for corresponding International Patent Application No. PCT/EP2013/066006, mailed Nov. 5, 2013.
Fujitsu, "Handover Duration Analysis for Relays", Agenda Item: 15.1.4, 3GPP TSG-RAN WG3 Meeting #65bis, R3-092255, Miyazaki, Japan, Oct. 12-15, 2009.
ETSI TS 136 300 V8.12.0, LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8), Apr. 2010.
ETSI TS 136 331 V10.0.0, LTE; Evolved Universal Terrestrial Radio Access (E-UTRA); Radio Resource Control (RRC); Protocol specification (3GPP TS 36.331 version 10.0.0 Release 10), Jan. 2011.
ETSI TS 136 413 V10.6.0, LTE; Evolved Universal Terrestrial Radio Access Network (E-UTRAN); S1 Application Protocol (S1AP), (3GPP TS 36.413 version 10.6.0 Release 10), Jul. 2012.
ETSI TS 136 423 V10.1.0, LTE; Evolved Universal Terrestrial Radio Access Network (E-UTRAN); X2 Application Protocol (X2AP), (3GPP TS 36.423 version 10.1.0 Release 10), Apr. 2011.
European search report with the European search opinion issued for corresponding European Patent Application No. 16168720.7 mailed on Jun. 1, 2016.
Notice of Reason(s) for Rejection issued for corresponding Japanese Patent Application No. 2015-530326 mailed on May 24, 2016 with an English translation.
Alcatel-Lucent Shanghai Bell et al., "Interference analysis and simulation for relay", Agenda Item: 15.3, 3GPP TSG RAN WG1 #57bis, R1-092328, Los Angeles, CA (US), Jun. 29-Jul. 3, 2009.
Alcatel-Lucent, "System Design Frameworks to Support Type II Relay Operation in LTE-A", Agenda Item: 15.3, 3GPP TSG RAN WG1 #58, R1-093355, Shenzhen, China, Aug. 24-28, 2009.

* cited by examiner

--Prior Art--

--Prior Art--

(1) User Plane  (2) Control Plane

*--Prior Art--*

*--Prior Art--*

HANDOVER WITH MOBILE RELAYS

CROSS-REFERENCE TO RELATED APPLICATIONS

This application is a continuation of U.S. application Ser. No. 14/638,611, filed on Mar. 4, 2015, now pending which is a continuation of International Patent Application No. PCT/EP2013/066006, filed Jul. 30, 2013, now pending, and claims priority to European Patent Application No. 12183655.5, filed Sep. 10, 2012, the contents of each are herein wholly incorporated by reference.

FIELD OF THE INVENTION

This invention generally relates to wireless communication systems and in particular, to a handover method in such systems.

BACKGROUND OF THE INVENTION

Wireless communication systems are widely known in which subscriber stations communicate wirelessly in cells provided by base stations. Next generation wireless communications systems such as the Universal Mobile Telecommunications System (UMTS) and the UMTS Long Term Evolution (LTE) aim to offer improved services to the user compared to the existing systems. These systems are expected to offer high data rate services for the processing and transmission of a wide range of information, such as voice, video and IP multimedia data.

The subsequent description will refer to LTE by way of example, and the basic system architecture in LTE is illustrated in FIG. 1. In LTE the subscriber stations are referred to as user equipments (UEs) and the base stations are called enhanced NodeBs (eNBs). As can be seen, each UE 12 connects over a wireless link via a Uu interface to an eNB 11, which defines one or a number of cells for wireless communication. There is a network of eNBs referred to as the "eUTRAN".

Each eNB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNBs, in the network. In addition, a not-shown PDN [Packet Data Network] Gateway (P-GW) is present, separately or combined with the S-GW 22, to exchange data packets with any packet data network including the Internet. The wired links to the core network EPC (where EPC stands for Evolved Packet Core) are referred to as "backhaul" and employ Internet Protocol (IP).

As is implied by the above distinction between MME/S-GW and PDN-GW, in LTE, control signalling is separated from user data traffic; thus there is a "user plane" which is distinct from the "control plane". FIG. 1, the S1 interface is labelled S1-U, the suffix -U denoting the user plane employed by the eNBs 11 for communicating user data to and from the S-GW 22. The S-GW is responsible for packet forwarding of user data on the downlink to the UE 12 and on the uplink. The S-GW 22 provides a "mobility anchor" for the user plane during handovers of a UE 12 from one eNB 11 to another.

In parallel to this, there is an interface S1-MME (sometimes called S1-C) via which the eNBs 11 exchange control messages with the MME 21. The main function of the MME 21, as its name suggests, is to manage mobility of the UEs 12, and it is a signalling-only entity; in other words, user data packets do not pass through the MME. The MME 21 is also responsible for controlling security (including authenticating users), and for EPS bearer control (see below). In practice, there may be several MMES forming a MME "pool". One eNB can have several S1-MME interfaces towards several MMES.

In addition, as shown in FIG. 1, the eNBs 11 communicate among themselves by a (usually) wireless link, using an interface called X2 for mutual co-ordination, for example when handing over a UE 12 from one cell to another. There is only one X2 interface between two eNBs.

In the above configuration, communications among eNBs can be regarded as communications among peers (network nodes at the same hierarchical level) with the MME constituting a higher level entity in the system.

To support high data rates in next-generation wireless communication systems, relay nodes may be employed as capacity boosters between the subscriber stations and the base stations, or in other words (in the case of LTE) between UEs and eNBs. So-called mobile relay base stations are one possible type of relay node. Mobile relay base stations provide the same functionality as conventional base stations, but their link to the network is provided by using a similar radio interface as that used by UEs. In other words a mobile relay base station connects to an eNB (called a "donor" eNB or DeNB in LTE) in a similar way as an ordinary UE.

As the name suggests, a mobile relay base station is expected to have full base station functionality, in particular the ability to handle both user plane and control plane traffic. As the name also suggests, a mobile relay base station is mobile, in other words it can be assumed to move with a certain speed relative to the eNBs (which are generally fixed) and possibly also with respect to at least some UEs to which it is connected. Consequently, as the mobile relay base station moves it has to be handed over from a serving DeNB to another DeNB in order to maintain a continuous connection to the network. Since the mobile relay base station is expected to handle both control plane and user plane traffic, handover of a mobile relay base station conventionally involves handover of both types of traffic.

The basic LTE system architecture with a mobile relay base station is shown in FIG. 2. A UE 12 is connected to a mobile relay base station (labelled Mobile Relay 14 in FIG. 2) by a wireless link using the Uu radio interface. The Mobile Relay 14, in turn, connects to a DeNB 13 over a wireless link via the Un interface. The Donor (also called Anchor) eNB 13 may serve one or more mobile relays 14 (as well as possibly relay nodes of other kinds) and may also communicate directly with other UEs.

The User Plane data for UE 12 (user data traffic) is routed to the S-GW (labelled Serving Gateway 22). Typically the S-GW is used for several eNBs which may be interconnected by the X2 interface, which may be a real physical connection between the eNBs, or implemented as a logical connection via other network nodes. The DeNB 13 is the eNB that is connected to the Mobile Relay 14 using the radio interface (Un) and which uses similar radio resources to the Uu radio interface.

Although the Mobile Relay is treated like an eNB to some extent, and thus needs to send and receive S1-AP and/or X2-AP signalling, as is clear from FIG. 2 the S1 (and possibly X2) interface is carried between the RN and its DeNB over the Un interface.

Transmission of messages between nodes in a radio network, such as between mobile relays and eNBs, involves the use of multi-layer protocol stacks. On the transmission side, starting from the top of the stack at an application layer, each layer in the protocol stack processes units of data (packets) in some way, usually adding a header to the data unit before passing it down to the next lower layer or sub-layer. The headers include fields identifying the operations performed at that protocol layer. On the reception side, each layer decodes the header inserted in the corresponding transmission-side layer to allow reconstruction of a data unit, which is then passed up to the next higher layer.

FIG. 3 shows the protocol stacks in LTE for (1) User Plane and (2) Control Plane.

In the User Plane, user data traffic is transported via the two radio interfaces (Uu and Un). The User-Plane consists of Packet Data Convergence Protocol (PDCP), Radio Link Control (RLC), Medium Access Control (MAC) and PHYsical (PHY) protocol layers. At the PDCP protocol layer, one protocol of particular relevance for present purposes is GTP-U, which is used on the S1 interface between the eNB and S-GW and on the S5/S8 interface between S-GW and P-GW. GTP stands for GPRS Tunneling Protocol and allows user data packets to be conveyed ("tunnelled") between the P-GW and eNB.

The concept of "bearers" is important for achieving quality-of-service (QoS) in a packet-based network such as LTE. In general, a "bearer" can be thought of as an information transmission path of defined capacity, delay and bit error rate, etc. so as to enable a given service or control function to be provided. Various types or levels of bearer can be established, the radio part being set up using radio resource control or RRC. A single UE may have associated with it multiple bearers simultaneously for providing different services to the user.

FIG. 4 shows an EPS Bearer Service Architecture employed in LTE. The left side of the Figure represents the eUTRAN with the EPC occupying the middle part of the Figure. At the right-hand side, outside the LTE system as such, there is the Internet. The vertical bars represent the main entities in the user plane, from the UE 12 to eNB 11 through to S-GW 22 and P-GW 23, terminating in a peer entity 24 (such as an Internet web server) connected to the P-GW 23. Communication takes place between the S-GW and P-GW over an S5 or S8 interface. To provide an end-to-end service between the UE 12 and Peer Entity 24 (as indicated by the upper horizontal band in the figure), the system sets up "bearers" as shown. An EPS Bearer represents the entire connection within the LTE system; it constitutes a QoS flow for a particular service. The connection continues outside the LTE system via an External Bearer.

The EPS Bearer is made up, in turn, of a radio bearer over the link between the UE 12 and eNB 11, and an S1 Bearer between the eNB 11 and S-GW 22. A further Bearer (S5/S8 Bearer) is set up between the S-GW 22 and P-GW 23. Each Bearer can be regarded as a "tunnel" in a given protocol layer for transport of packets, connecting the end points for the duration of a particular service or "session", e.g. voice call or download. Thus, the radio bearer transports the packets of the higher-layer EPS Bearer between the UE 12 and eNB 11, and the S1 Bearer transports the packets of the EPS Bearer between the eNB 11 and S-GW 22. Bearer control through RRC, mentioned previously, includes the setting up of bearers for a particular session so as to ensure sufficient QoS, taking into account the resource situation in the E-UTRAN and existing sessions already in progress. It also involves the modification and release of radio bearers.

Further details of handover and signalling procedures in LTE are contained in the following documents which are hereby incorporated by reference:—

3GPP TS36.300 "Evolved Universal Terrestrial Radio Access (E-UTRA) and Evolved Universal Terrestrial Radio Access Network (E-UTRAN); Overall description; Stage 2"

3GPP TS36.331 "Evolved Universal Terrestrial Radio Access (E-UTRA); Radio Resource Control (RRC); Protocol specification"

3GPP TS36.413 "Evolved Universal Terrestrial Radio Access (E-UTRA) and Evolved Universal Terrestrial Radio Access Network (E-UTRAN); S1 Application Protocol (S1-AP)"

3GPP TS36.423 "Evolved Universal Terrestrial Radio Access (E-UTRA) and Evolved Universal Terrestrial Radio Access Network (E-UTRAN); X2 Application Protocol (X2-AP)"

As already mentioned, in a wireless communication system employing mobile relays as in FIG. 2, there is a requirement for handover of the mobile relays and correspondingly of the UEs connected to those mobile relays. Mobility management functions in LTE and UMTS networks for UEs in connected mode handle all necessary steps for handover. These steps include processes that precede the final HO handover decision on the source network side (control and evaluation of UE and base station measurements), preparation of resources on the target network side, commanding the UE to the new radio resources and finally releasing resources on the source network side. Handover of UEs involves transferring, from one eNB to another, all the information related to the UE, called its "context". Mobility management also contains mechanisms to transfer context data between the eNBs, and to update node relations on both control plane and user plane.

A typical handover procedure in LTE networks, taken from the above mentioned 3GPP TS36.300, is illustrated in FIG. 5, showing three phases of handover respectively labelled "Handover Preparation", "Handover Execution" and "Handover Completion".

Suppose that a connected-mode UE 12 (or likewise a mobile relay base station acting as a UE towards its donor base station) is connected to a Source eNB 11 providing a serving cell, and can receive at least reference signals from a neighbour cell provided by a Target eNB 11. In a step 1. "Measurement Control", the UE 12 is triggered to send measurement report by the rules set by i.e. system information, specification etc. (see 3GPP TS36.331). In a step 2. "Measurement Reports", UE 12 performs measurements of attributes of the serving and neighbour cells. Step 3 "HO decision" is for Source eNB 11 to make a decision based on measurement report and RRM information to hand over the UE 12. Then, (4. "Handover Request") the Source eNB issues a handover request to the Target eNB, passing necessary information to prepare the handover at the target side. In a step 5. "Admission Control", admission control may be performed by the Target eNB to determine whether or not it agrees to accept the UE. Then (6. "Handover Request Ack.") the Target eNB 11 prepares the HO and sends the handover request Ack. to the Source eNB, in which a handover command is included for the Source eNB to forward the command in the form of a message labelled "7. RRC Conn. Reconf.mobilityControlinfo", to instruct the UE to connect to the target cell.

Several necessary steps are performed on the network side to ensure a lossless user plane path switch, in other words minimum interruption in the data packets being transmitted to or from the UE. These include a step 8. "SN Status Transfer" by which the Source eNB informs the Target eNB of the Sequence Number (SN) up to which it has successfully delivered data packets, in order for the Target eNB to know at which packet to start transmission.

After receiving the handover command, UE performs synchronisation to Target eNB (9. "Synchronization") and accesses the target cell. The Target eNB responds (10. "UL Allocation+TA for UE") with uplink allocation and timing advance. When the UE has successfully accessed the target cell, the UE sends a message (11. "RRC Connection Reconfiguration Complete") to the Target eNB 11 to confirm the completion of handover.

The subsequent steps 12.-15. in FIG. 5 can be summarised as a user plane path switch, which changes the DL user plane data delivery path from the path: S-GW->Source eNB to: S-GW->Target eNB. Finally, the MME 21 confirms (16. Path Switch Req. Ack) the handover and the Target eNB 11 then sends a message (17. "UE Context Release") to instruct the Source eNB to release the resources previously allocated to the handed-over UE.

As will be understood, the above handover is a handover of both the signalling and data traffic, or in other words both the control plane and user plane. This is what is normally understood by "handover" in a wireless communication system.

The problem addressed by this invention is that in systems such as LTE and UMTS, mobile relay base stations are deployed in certain areas, for example, peak hours in city centres. Mobile relays installed in vehicles (such as, cars, buses) are provided primarily for the use of UEs of passengers of those vehicles. However, such mobile relays move with relatively low speed, which also allows other users such as pedestrians (outside of the vehicles) with low speed to access these mobile relays. Thus, in this scenario, mobile relays are deployed as capacity boosters serving UEs which have a low relative speed relative to the mobile relays. The key issue in this scenario is how to support handovers of the UEs which are necessitated by the movement either of mobile relays or of UEs.

SUMMARY OF THE INVENTION

According to a first aspect of the present invention, there is provided a handover method in a wireless communication system having a subscriber station, at least one base station and a plurality of relay stations, the subscriber station exchanging data traffic and signalling by employing wireless links with the base station, said wireless links including relay links which are indirect links between the subscriber station and the base station via one or more of the relay stations, the method comprising:
  measuring a signal quality of each of a plurality of said wireless links;
  determining a need for a handover of the subscriber station from a serving relay station to another relay station by comparing the signal quality of a said relay link with a predetermined threshold and/or with the signal quality of another said wireless link; and
  performing a handover of the subscriber station from said serving relay station to said another relay station; characterised by:
  employing, for control signalling between the subscriber station and the base station, a said wireless link which is a direct link between the subscriber station and the base station; and
  performing said handover for data traffic only whilst maintaining said direct link for control signalling.

The "measuring" referred to above may be performed either at the subscriber station or at the serving relay station, or both, as explained below.

The relay stations referred to above are of a type having base station functionality at least to the extent of allowing separation of user plane and control plane functions. Each relay station preferably defines its own cell(s) and thus appears like a base station to the subscriber station. Preferably, at least the serving relay station is mobile and the base station acts as a donor base station for the relay stations. Thus, in LTE terminology, the relay station may be referred to as a "mobile relay base station", and the base station as a donor eNB.

Various embodiments of the method are provided, which differ in the trigger for the handover.

In the first embodiment the measuring is performed at least at the subscriber station and the determining is performed at the base station in response to reports on said signal quality received from the subscriber station.

In second and third embodiments the measuring is performed at least at the serving relay station and the determining is performed at the base station in response to reports on said signal quality received from the serving relay station. Of course, in the second and third embodiments the subscriber station may also measure the signal quality of its wireless links; however these measurements are not decisive for the handover decision.

In the first embodiment, preferably, the determining determines whether the signal quality of a wireless link of the subscriber station with another relay station exceeds by a predetermined threshold the measured signal quality of a wireless link between the subscriber station and the serving relay station.

In the second embodiment, preferably, the determining determines whether the measured signal quality of a wireless link of the serving relay station with the subscriber station is worse than a predetermined threshold.

In the third embodiment, preferably, the determining determines whether the signal quality of a wireless link of the serving relay station with another base station exceeds by a predetermined threshold the signal quality of a wireless link between the serving relay station and the donor base station.

The third embodiment may further comprise the relay station which was the serving relay station itself performing a handover from said base station to said another base station.

In any method as defined above, performing a handover may include the base station identifying said another relay station as a target relay station, sending a cell activation request to the target relay station including a context for the subscriber station and identifying the relay station which currently acts as a serving relay station for data traffic of the subscriber station.

The further procedure may include:
  the target relay station performing admission control of the subscriber station;
  the base station sending a deactivation request to the serving relay station;
  the base station sending a data traffic only handover command to the subscriber station and a request to the subscriber station to connect to the target relay station for data traffic transmission;
  the serving relay station sending a status report to the target relay station;
  the serving relay station forwarding data traffic to the target relay station; and the subscriber station detaching from the serving relay station and connecting to the target relay station for data traffic transmission.

According to a second aspect of the present invention, there is provided a wireless communication system having a subscriber station, at least one base station and a plurality of relay stations, the subscriber station arranged for exchanging data traffic and signalling by employing wireless links with the base station, said wireless links including relay links which are indirect links between the subscriber station and the base station via one or more of the relay stations, the system comprising: measurement means for measuring a signal quality of each of a plurality of said wireless links; handover determination means for determining a need for a handover of the subscriber station from one relay station to another relay station by comparing the signal quality of a said wireless link with a predetermined threshold and/or with the signal quality of another said wireless link; and handover performing means for performing a handover of the subscriber station from said one relay station to said another relay station; characterised in that: the subscriber station is arranged to employ a direct link between the subscriber station and the base station for control signalling between the subscriber station and the base station; and said handover performing means is arranged for performing a handover for data traffic only whilst maintaining said direct link for control signalling.

Thus, embodiments of the present invention involve the concept of a "data plane handover" which is different from handovers conventionally employed in a wireless communication system. In one form of data plane handover, the user plane data delivery path between the S-GW and donor eNB remains the same while the user plane data delivery path changes from the donor eNB to a new mobile relay base station.

According to a third aspect of the present invention, there is provided a subscriber station for use in the system as defined above.

According to a fourth aspect of the present invention, there is provided a relay station for use in the system.

According to a fifth aspect of the present invention, there is provided a base station for use in the above wireless communication system.

According to a further aspect of the present invention, there is provided software which, when executed by a processor of a base station, a mobile relay station and/or a subscriber station in a wireless communication system, performs any method as defined above. Such software may be stored on a computer-readable medium.

To summarise, embodiments of the present invention may provide a wireless communication method to provide mobility support of UEs that are served by mobile relay base stations, by providing handover of user equipment for data traffic only between two base stations. This is achieved by information exchanging between the source and target mobile relay stations of the concerned UE in handover, and/or the corresponding donor base stations if applicable. The handover is triggered by any of the following situations:
(i) based on UE's measurement report, the signal quality of a neighbour cell is much better than the current serving cell;
(ii) based on the measurement of the serving mobile relay base station, the signal quality of the link to the UE is worse than a certain threshold; or (iii) based on the measurement of the serving mobile relay base station, the signal quality of a neighbour cell (potential donor base station) is much better than the current donor base station.

In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between a network and terminals in a wireless communication system. In a wireless communication system, typically, wireless access to the network is provided by one or more base stations or access points. Such a base station may take any form suitable for transmitting and receiving such signals. It is envisaged that the base stations will typically take the form proposed for implementation in the 3GPP LTE and 3GPP LTE-A groups of standards, and may therefore be described as an eNB (eNodeB) (which term also embraces Home eNB or HeNB) as appropriate in different situations. However, subject to the functional requirements of the invention, some or all base stations may take any other form suitable for transmitting and receiving signals from user equipments.

Similarly, in the present invention, each subscriber station may take any form suitable for transmitting and receiving signals from base stations. For example, the subscriber station may be referred to as a user equipment (UE) or mobile station (MS), and may take any suitable fixed-position or movable form. For the purpose of visualising the invention, it may be convenient to imagine the terminal as a mobile handset (and in many instances at least some of the user equipments will comprise mobile handsets), however no limitation whatsoever is to be implied from this. In the detailed description which follows, in which embodiments of the present invention are described with respect to LTE by way of example, the terminal is referred to as a UE in accordance with usual LTE terminology.

BRIEF DESCRIPTION OF THE DRAWINGS

Reference is made, by way of example only, to the accompanying drawings in which.

DETAILED DESCRIPTION

Figure 6:
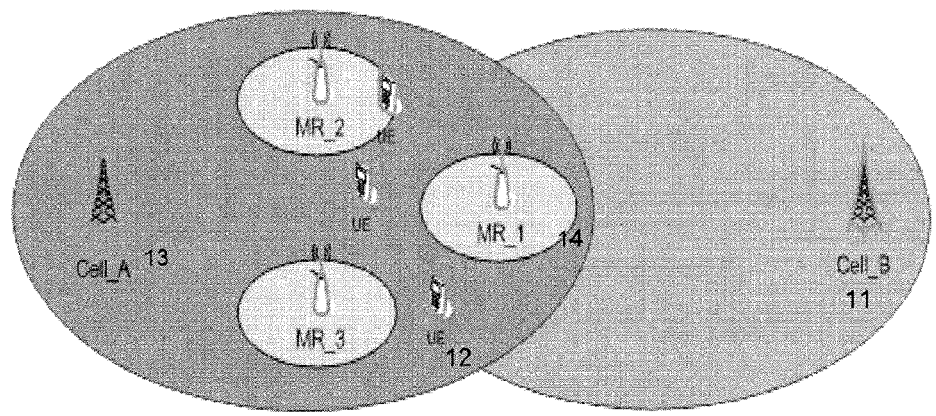
FIG. 6 shows a handover scenario involving mobile relays.

Embodiments of the present invention may provide a wireless communication method to provide mobility support of UEs that are served by mobile relay base stations. FIG. 6 illustrates an example of the addressed problem. Suppose that mobile relay base station 14 MR_1 is currently connected to Cell_A provided by a donor eNB 13, and is moving at relatively low speed towards Cell_B provided by another eNB 11. Suppose also that a UE 12 is attached to MR_1 and in connected mode, but has a low speed relative to MR_1. While MR_1 is moving away from the UE 12, handing over to another cell is required for this UE 12 in order to keep its connectivity with a certain QoS guarantee.

If we assume further that the traffic load is very high in Cell_A, it would be beneficial if this UE 12 can be handed over to another mobile relay station MR_2 or MR_3 (that is acting as a capacity booster). This presents a handover situation which is more complex than that shown in FIG. 3. For example, there may be no X2 interface available for communication between the two mobile relay base stations, even if they are served by the same donor eNB; consequently handover may have to proceed via the S1 interface. A further complication is that both MRs (source and target) will typically be moving. Due to complexity of this situation, it may require a long latency time to hand over the UE between two mobile relay base stations (which may be attached to different donor base stations), and this may not be not acceptable in terms of QoS requirements. An efficient handover scheme is required in order to solve this issue.

Embodiments of the present invention can allow handover latency reduction in the case that a UE that is attached to a mobile relay and is losing the signal. Rather than connecting to the donor it connects to another mobile relay (assuming sufficient signal strength). The principle of the invention will now be explained, followed by specific embodiments reflecting various handover situations.

A feature of the present invention is that it enables handover of data traffic to be performed separately from control signalling, which is dealt with separately. The control plane may be unaffected by such a handover. This is referred to below as a "data plane handover" for a UE or a group of UEs from a mobile relay base station to a target base station.

Figure 4:
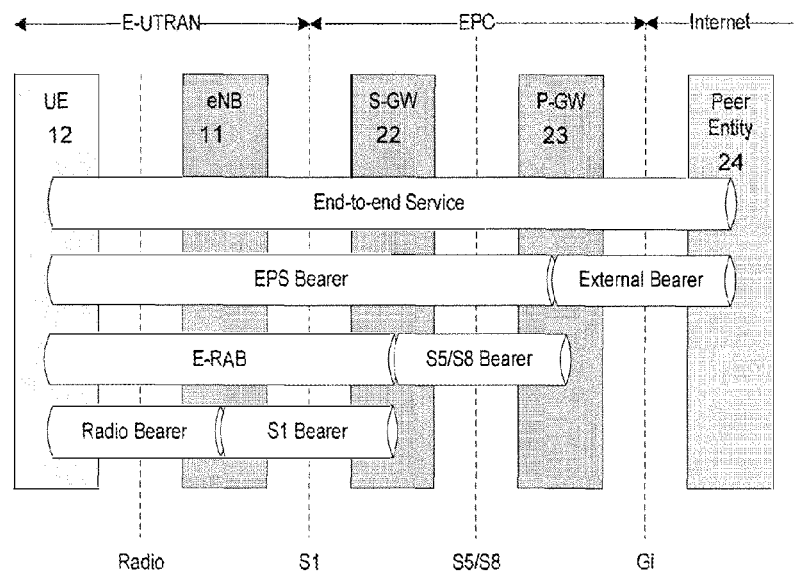
FIG. 4 shows bearers in an LTE system.
Figure 5:
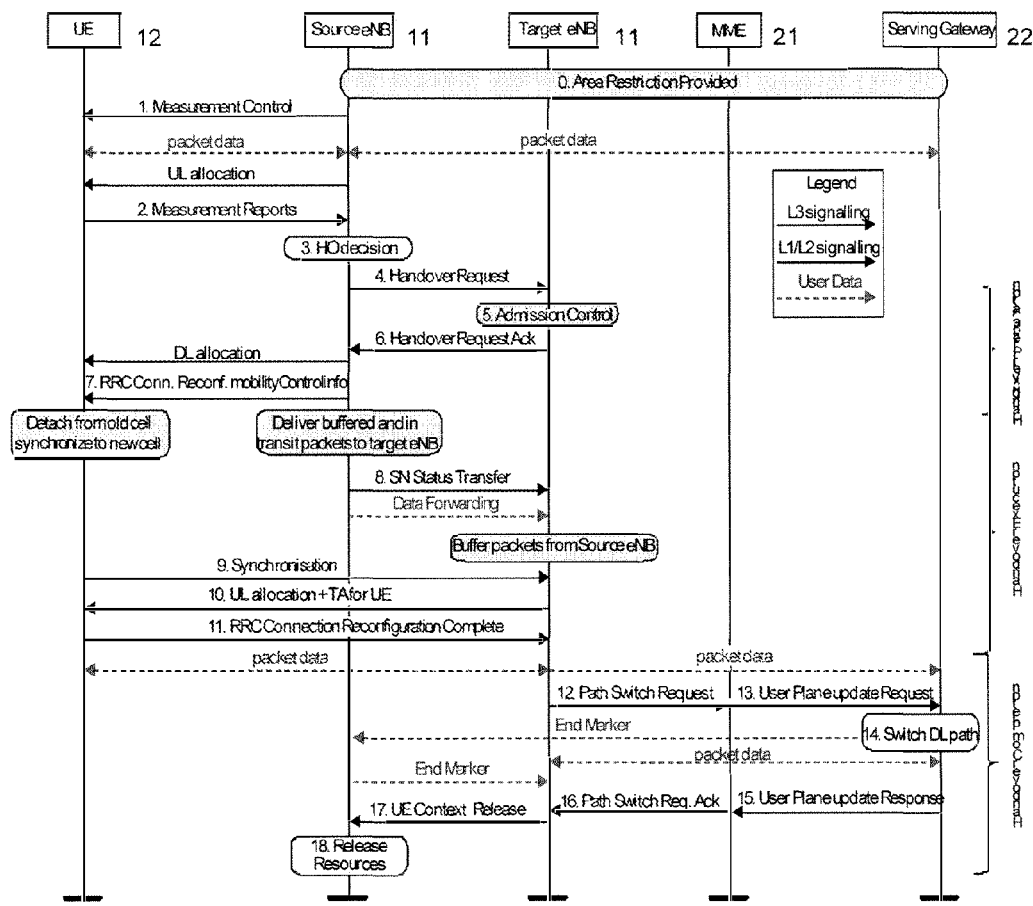
FIG. 5 shows a conventional handover procedure in LTE.
Figure 7:
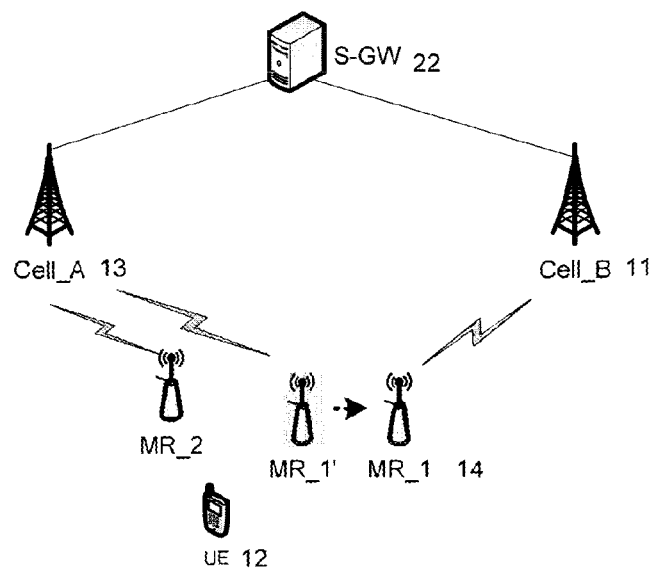
FIG. 7 shows the principle of a "data plane only" handover in accordance with the present invention.

Referring to FIG. 7, a UE 12 connects to a mobile relay base station (MR_1') that is connected to a donor base station 13 (Cell_A) for backhaul connectivity (as shown in FIG. 4). The control plane signalling is handled by the donor base station 13 (so for example the S1 interface is terminated between donor eNB and MME), while the mobile relay base station MR_1' serves the UE 12 for its data traffic delivery at both uplink and downlink (in a manner somewhat analogous to CoMP or CA). In other words, the UE 12 has a "direct" link with the donor eNB 13 for control signalling, in addition to a relay link with MR_1' for data traffic.

Figure 1:
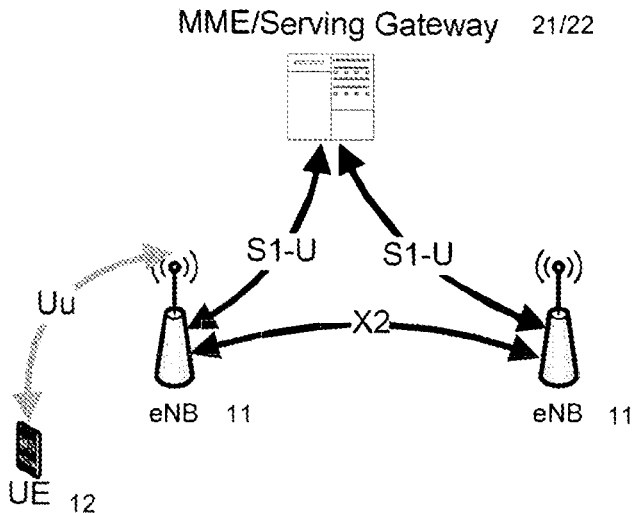
FIG. 1 shows a conventional (non-relay) system architecture in LTE.
Figure 2:
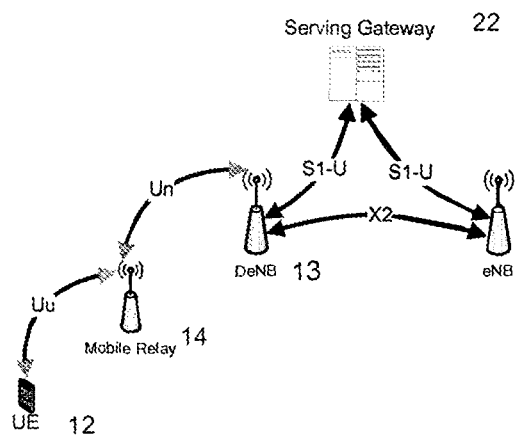
FIG. 2 shows a system architecture including mobile relays in LTE.
Figure 3:
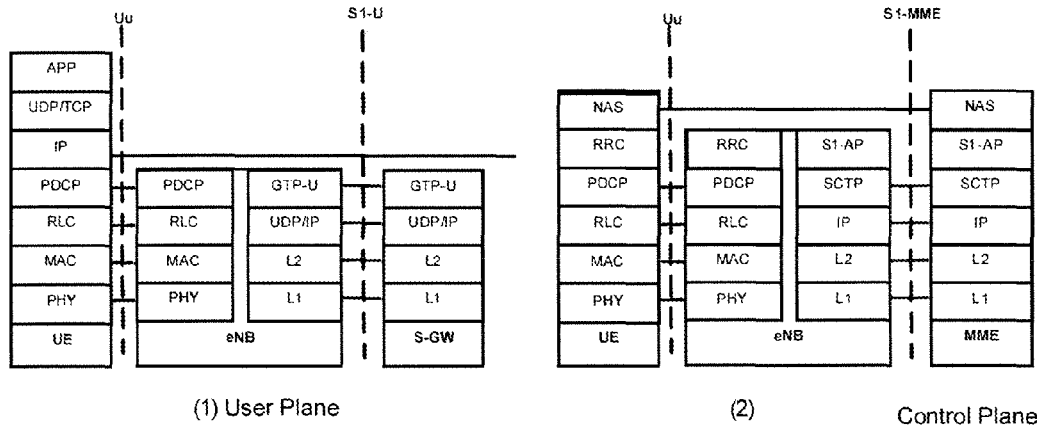
FIG. 3 shows the protocol layers for (1) the User plane and (2) the Control Plane in an LTE system.

Like a conventional handover, a data plane handover needs to be performed when the quality of radio connection between the UE 12 and the mobile base station MR_1' becomes deteriorated, which may be due to the mobile relay moving away from the UE or vice versa. It should be noted that whilst the principle of separation of control plane and user plane is well-known and indeed inherent to the LTE standard as indicated in FIG. 3, such a data plane handover (i.e. without also transferring the path for control signalling) is not conventional.

It may be assumed that each cell (actual or potential donor eNBs 13 and 11) is broadcasting reference signals, which the UE or mobile relay base station may use to assess the signal quality with respect to each cell. Considering the scenario shown in FIG. 7, in which it is desired to handover the UE 12 from MR_1' to MR_2, the overall handover scheme consists of the following steps:

1. The UE performs measurements of its serving cells (e.g. MR_1' and Cell_A in FIG. 7) and neighbouring cells (e.g. MR_2 in FIG. 7), and reports the measurement results to the network when, for example, the signal quality at the UE of a neighbour cell (Cell_B) is better than the signal quality at the UE from the current serving cell. With respect to Cell_B, the measurement procedure may be similar to that adopted in CoMP/CA (Coordinated Multipoint/Carrier Aggregation) for example.

Figure 8:
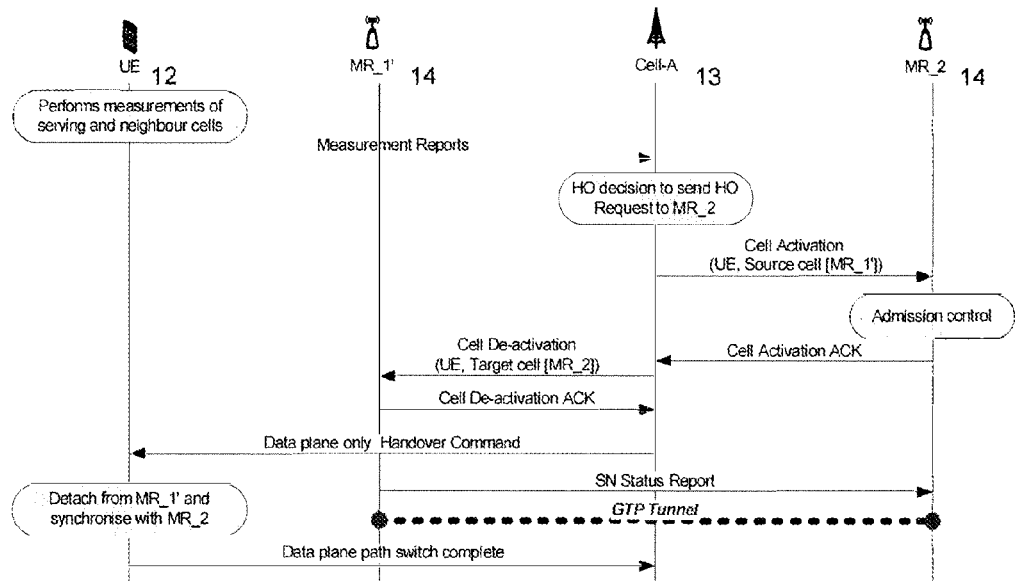
FIG. 8 shows a handover procedure in accordance with a first embodiment ("Case 1") of the present invention.
Figure 9:
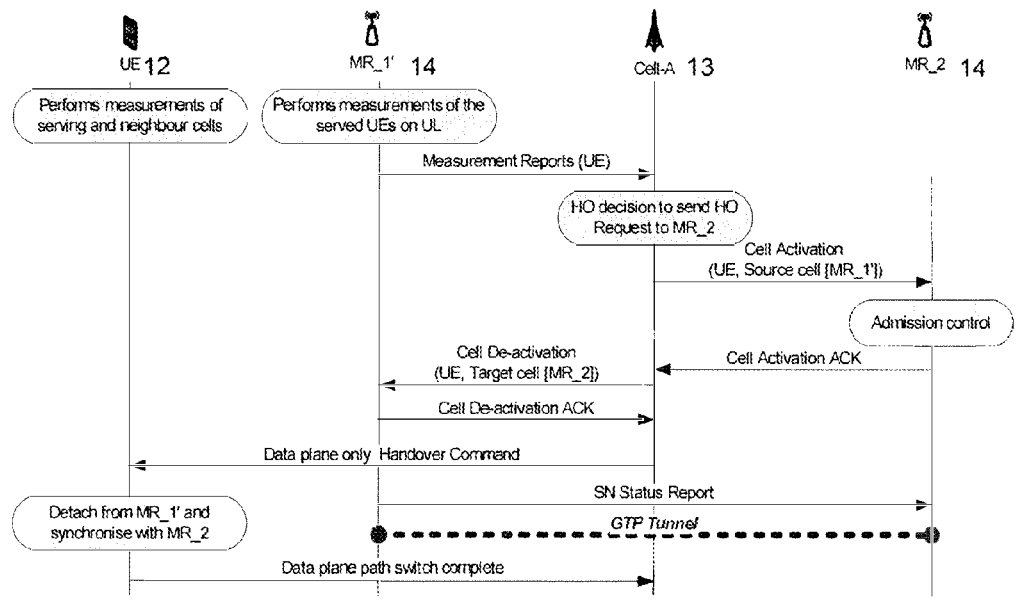
FIG. 9 shows a handover procedure in accordance with a second embodiment ("Case 2") of the present invention.
Figure 10:
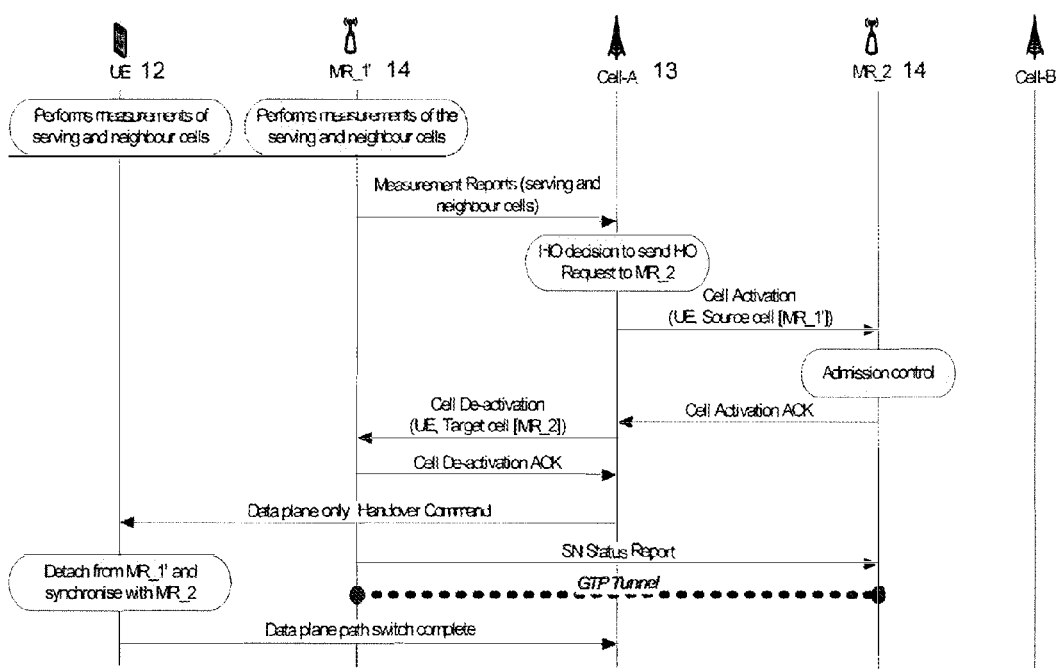
FIG. 10 shows a handover procedure in accordance with a third embodiment ("Case 3") of the present invention.

Meanwhile, the current serving cell MR_1' monitors the link quality to the donor base station (Cell_A) and signals (such as a cell-specific reference signal, CRS) from the neighbouring cells (e.g. Cell_B in FIG. 4), as well as the link quality to the UE by measuring, for example, sounding channel of the UE. Handover may be triggered when certain condition is met, such as 1) Based on UE's measurement report, the signal quality of a neighbour cell is much better than the current serving cell (i.e. MR_1'). (FIG. 8 illustrates the overall message flow of this case)
2) Based on the measurement of the serving mobile relay base station, the signal quality of the link to the UE is worse than a certain threshold. (FIG. 9 illustrates the overall message flow of this case)
3) Based on the measurement of the serving mobile relay base station, the signal quality of a neighbour cell (i.e. Cell_B) is much better than the current donor base station (i.e. Cell_A). (FIG. 10 illustrates the overall message flow of this case).

The subsequent procedure depends upon which of the above Cases 1)-3) applies. Thus, each of the following Cases constitutes a different embodiment of the present invention.

Case 1)

2.1. In case 1), the UE sends measurement reports to the serving eNB (e.g. Cell_A in FIG. 8) that handles control signalling.

3.1 Cell_A makes HO decision to initiate the handover procedure towards the most suitable neighbour cell MR_2. Because the Cell_A continues handling this UE's control signalling, only data traffic needs to be handed over to the target cell. For this purpose, Cell_A sends cell activation request to MR_2 (that is a mobile relay currently connected the Cell_A), in which the concerned UE's context is included as well as the current serving cell for data traffic MR_1'.

4.1 MR_2 performs admission control, and sends acknowledgement to confirm the handover.

5.1 Cell_A sends de-activation request to MR_1' asking MR_1' to handover the data traffic of the concerned UE to the target cell MR_2. MR_1' acknowledges the request.

6.1 Cell_A sends data plane only handover command to the UE and asks the UE to connect to target cell MR_2 for data traffic transmission.

7.1 Meanwhile, MR_1' prepares the data traffic handover of the concerned UE by sending the SN status report to the target cell MR_2 indicating uplink PDCP SN receiver status and the downlink PDCP SN transmitter status associated with the concerned UE's data traffic. In addition, GTP tunnel will be set up between the source and target cells for data traffic forwarding.

8.1 Upon receipt of the data plane only HO command, the UE detaches from the source cell MR_1' and connects to target cell MR_2 for data traffic transmission. The UE sends out data plane path switch complete message to the serving base station to indicate the completion of this handover procedure. Meanwhile, the UE maintains its "direct" link with the donor eNB (Cell_A) for control plane signalling.

Case 2)

2.2. In case of 2), the MR_1' sends measurement reports to the serving eNB (e.g. Cell_A in FIG. 9) that handles control signalling when the signal quality of the link to the UE is worse than a certain threshold.

3.2 Cell_A makes HO decision based on the measurement report for MR_1' concerning the UE. Taking into account of the UE's report, Cell_A initiates the handover procedure towards the most suitable neighbour cell MR_2. Because the Cell_A continues handling this UE's control signalling, only data traffic needs to be handed over to the target cell. For this purpose, Cell_A sends cell activation request to MR_2 (that is a mobile relay currently connected the Cell_A), in which the concerned UE's context is included as well as the current serving cell for data traffic MR_1'.

4.2-8.2. These are the same as steps 4.1-8.1 mentioned above.

Case 3)

FIG. 10 shows the process of handover by Cell_A of UEs currently served both by itself (for control plane signalling) and by MR_1' (for data traffic transmission). Such handovers need to take place before Cell_A hands over MR_1' itself to Cell_B (not shown here).

2.3. In case of 3), the MR_1' sends measurement reports to its donor base station when the signal quality of a neighbour cell (i.e. Cell_B in FIG. 10) is much better than the current donor base station (i.e. Cell_A).

3.3 Before Cell_A starts handover preparation for the MR_1' towards Cell_B, it needs to handover to MR_2 the UEs currently served by both itself (for control plane signalling handling) and MR_1' (for data traffic transmission). Cell_A makes HO decision for such UEs based on the measurement report from the UE and initiates the handover procedure towards the most suitable neighbour cell MR_2. Because the Cell_A continues handling this UE's control signalling, only data traffic needs to be handed over to the target cell. For this purpose, Cell_A sends cell activation request to MR_2 (that is a mobile relay currently connected the Cell_A), in which the concerned UE's context is included as well as the current serving cell for data traffic MR_1'.

4.3-8.3. These are the same as steps 4.1-8.1 mentioned above.

Note: in this case, Cell_A may initiate the handover preparation procedure for the MR_1' towards target cell Cell_B in parallel. Such handover may take place in the conventional manner, and consequently is not shown here.

Thus, to summarise, an embodiment of the present invention relates to a scheme intended to 1) provide mobility support of user equipments that are served by mobile relay base stations; 2) provide handover of user equipment for data traffic only between two base stations. This is achieved by information exchanging between the source and target mobile relay stations of the concerned UE in handover, and/or the corresponding donor base stations if applicable.

The handover is triggered by a combination of one or more of: 1) based on UE's measurement report, the signal quality of a neighbour cell is much better than the current serving cell; or 2) based on the measurement of the serving mobile relay base station, the signal quality of the link to the UE is worse than a certain threshold; or 3) based on the measurement of the serving mobile relay base station, the signal quality of a neighbour cell is much better than the current donor base station.

Various modifications are possible within the scope of the present invention.

Reference has been made above to mobile relay base stations. However, it is not essential for the relay stations to be mobile. Embodiments of the present invention may also be advantageously applied with fixed relay stations, or with a mixture of fixed and moving relay stations.

Whilst it is not essential for each relay station to have full base station functionality as implied by the term "mobile relay base station", it is necessary for each relay station to which the present invention is applied to have both user plane and control plane functionality, so that the user data traffic can be handled differently from the control plane signalling.

The above embodiments have described a "lossless" handover by way of example. However, the present invention is equally applied to a so-called "seamless" handover, in which priority is given to the speed of handover (minimum latency) rather than to avoiding loss of packets. In such a case, the procedure will be the same as described with respect to FIGS. 8 to 10 except that there is no need for the SN Status Report and GTP Tunnel.

Reference is made above to a "direct" link between the UE and donor eNB for the control signalling, by which is meant a wireless link which does not include any mobile relay base station. It is not essential for this to be a single hop from UE to donor eNB. A fixed relay station, for example, if it provides a sufficiently robust connection, could be interposed in this "direct" link. Consequently the claims refer to a "first link" between the subscriber station (UE) and base station (donor eNB), the term "second link" being used to refer to wireless links via one or more (mobile) relay stations (MRs).

Any of the embodiments mentioned above may be combined in the same system. The same eNB may operate in accordance with more than one of the embodiments simultaneously, and one UE may likewise operate in accordance with more than one of the embodiments simultaneously. Whilst the above description has been made with respect to LTE and LTE-A, the present invention may have application to other kinds of wireless communication system also. Accordingly, references in the claims to "user equipment" are intended to cover any kind of subscriber station, MTC device and the like and are not restricted to the UE of LTE.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

INDUSTRIAL APPLICABILITY

The invention allows efficient handover in mobile relay base station scenarios in a 3GPP network, e.g. UMTS or LTE network. This is achieved by enabling the user plane data traffic only handover between two base stations. The fields of application of this invention include all wired and wireless communications systems where relaying techniques are used.

What is claimed is:

1. A subscriber station in a wireless communication system including at least one base station and a plurality of further stations, the subscriber station comprising:
 a transmitter; and
 a processor electrically coupled with the transmitter, the processor configured for:
  causing an exchanging of data traffic and signaling by employing wireless links with the at least one base station and one or more further stations of the plurality of further stations, the wireless links including a first wireless link between the subscriber station and a base station;
  employing the first wireless link for control signaling between the subscriber station and the base station;
  determining when a handover is triggered for a handover of the subscriber station from a first further station to a second further station, the first further station and the second further station from among the plurality of further stations;
  performing a handover for data traffic only of the subscriber station from the first further station to the second further station while maintaining the first wireless link with the base station for the control signaling.

2. The subscriber station of claim 1, the processor further configured for:
 measuring a signal quality of each of the wireless links.

3. The subscriber station of claim 2, the processor further configured for:
 reporting the measured signal quality to at least one of: the base station and a further station of the plurality of further stations; and
 receiving an indication that a handover is triggered, which indication is utilized in the determining by the subscriber station when the handover is triggered.

4. The subscriber station according to claim 1, wherein at least one of the plurality of further stations is connected to at least one other base station.

5. The subscriber station according to claim 1, wherein the plurality of further stations is configured for functionality allowing separation of user plane and control plane functions.

6. A user equipment in a wireless communication system including a base station and a plurality of further stations, the user equipment comprising:
 a transceiver configured for exchanging data traffic and signaling by employing wireless links with the base station and one or more further stations of the plurality of further stations, the wireless links including a first wireless link between the user equipment and the base station; and
 a processor coupled with the transceiver, the processor configured for:
  employing the first wireless link for control signaling between the user equipment and the base station;
  determining that a handover is triggered for a handover of the user equipment from a first further station to a second further station, the first further station and the second further station of the plurality of further stations;
  performing a handover for the data traffic of the user equipment from the first further station to the second further station while maintaining the first link with the base station for the control signaling.

7. The user equipment of claim 6, the processor further configured for:
 measuring a signal quality of each of the wireless links.

8. The user equipment of claim 7, the processor further configured for:
 reporting the measured signal quality to at least one of: the base station and a further station of the plurality of further stations; and
 receiving an indication from the base station that a handover is triggered, which indication is utilized in the determining by the user equipment when the handover is triggered.

9. A base station in a wireless communication system including a first further station and a second further station, the base station comprising:
 one or more processor circuits coupled to memory and configured for:
  exchanging control signaling with a subscriber station by a wireless link;
  determining a need for a handover of data traffic of the subscriber station from the first further station to the second further station; and
  performing a handover for the data traffic of the subscriber station from the first further station to the second further station while maintaining the wireless link with the subscriber station for the control signaling.

10. The base station of claim 9, the processor further configured for:
 measuring a signal quality of each of a plurality of wireless links;
 determining a need for a handover of data traffic of the subscriber station from the first further station to the second further station by comparing the signal quality of a wireless link between the first further station and the subscriber station with a predetermined threshold and/or with the signal quality of another wireless link.

11. The base station of claim 9, the processor further configured for:
 receiving reports of a signal quality of each of a plurality of wireless links from at least one of the subscriber station, the first further station and the second further station;
 determining a need for a handover of data traffic of the subscriber station from the first further station to the second further station by comparing the reported signal quality of a wireless link between the first further station and the subscriber station with a predetermined threshold and/or with the signal quality of another wireless link.

12. The base station of claim 9, wherein the performing a handover for the data traffic includes instructing the second further station to allocate resources for the data traffic of the subscriber station to accommodate the handover from the first further station to the second further station while the base station is maintaining the wireless link with the subscriber station for the control signaling.

13. The base station according to claim 9, wherein at least one of the first further station and the second further station is connected to another base station.

14. The base station according to claim 9, wherein the plurality of further stations is configured for functionality allowing separation of user plane and control plane functions.

15. A handover method in a wireless communication system having at least one base station and a plurality of further stations, a subscriber station exchanging data traffic and signaling by employing wireless links with the base station and further stations of the plurality of further stations, the wireless links including a first wireless link between the subscriber station and the base station and a second wireless link provided by one or more of the further stations, the method comprising:

employing the first wireless link for control signaling between the subscriber station and the base station;

determining that a handover is triggered for a handover of the subscriber station from a first further station to a second further station, the first further station and the second further station from among the plurality of further stations; and performing a handover for the data traffic of the subscriber station from the first further station to the second further station while maintaining the first link with the base station for the control signaling.

16. The handover method of claim 15, comprising:

measuring a signal quality of each of a plurality of wireless links.

17. The handover method of claim 16, comprising:

reporting the measured signal quality to at least one of: the base station and a further station of the plurality of further stations; and receiving an indication from the base station that a handover is triggered, which indication is utilized in the determining by the subscriber station when the handover is triggered.

18. The handover method of claim 16, comprising:

exchanging data traffic with the second further station while maintaining the first link with the base station for the control signaling.

19. The handover method according to claim 15, wherein at least one of the plurality of further stations is connected to at least one other base station.

20. The handover method according to claim 15, wherein the plurality of further stations is configured for functionality allowing separation of user plane and control plane functions.

\* \* \* \* \*